United States Patent
Stamm Masias et al.

(10) Patent No.: US 9,533,286 B2
(45) Date of Patent: Jan. 3, 2017

(54) SINTER RESISTANT CATALYTIC MATERIAL AND PROCESS OF PRODUCING THE SAME

(71) Applicant: Toyota Motor Engineering & Manufacturing North America, Inc., Erlanger, KY (US)

(72) Inventors: Kimber L. Stamm Masias, Ann Arbor, MI (US); Paul T. Fanson, Brighton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 181 days.

(21) Appl. No.: 13/839,416

(22) Filed: Mar. 15, 2013

(65) Prior Publication Data

US 2014/0057781 A1 Feb. 27, 2014

Related U.S. Application Data

(60) Provisional application No. 61/691,445, filed on Aug. 21, 2012.

(51) Int. Cl.
*B01J 23/63* (2006.01)
*B01J 23/42* (2006.01)
(Continued)

(52) U.S. Cl.
CPC ............. *B01J 23/63* (2013.01); *B01D 53/945* (2013.01); *B01J 21/08* (2013.01); *B01J 23/40* (2013.01);
(Continued)

(58) Field of Classification Search
CPC ............. B01J 23/63; B01J 23/70; B01J 23/40; B01J 23/48; B01J 23/42; B01J 37/16; B01J 37/031; B01J 37/0211; B01J 35/0086; B01J 35/002; B01J 35/006; B01J 35/0013; B01J 21/08; B01D 53/945; B01D 2255/106; B01D 2255/2073; B01D 2255/20753; B01D 2255/9202; B01D 2255/2092; B01D 2255/908; B01D 2255/104; B01D 2255/1023; B01D 2255/2065; B01D 2255/1021; B01D 2255/30; B01D 2255/20746; B01D 2255/1028; B01D 2255/1025; B01D 2255/20738; Y02T 10/22

See application file for complete search history.

(56) References Cited

U.S. PATENT DOCUMENTS 6,149,877 A * 11/2000 Ogai .............................. 422/180
6,165,935 A * 12/2000 Williamson et al. .......... 502/339
(Continued)

OTHER PUBLICATIONS

Joo, Sang Hoon, et al.. "Thermally stable Pt/mesoporous silica core-shell nanocatalysts for high-temperature reactions." Nature Materials, vol. 8, Feb. 2009, pp. 126-131.

*Primary Examiner* — Anthony J Zimmer
(74) *Attorney, Agent, or Firm* — Dinsmore & Shohl LLP

(57) ABSTRACT

A catalytic material including particles formed of a catalytic core material having a thermally resistant porous shell coated over the catalytic core material. An oxygen storage material is dispersed within the thermally resistant porous shell. In an example, the oxygen storage material is ceria. The catalytic material can further include a catalytic support, wherein the particles are deposited on the catalytic support. The catalytic support can be a powdered oxide including a material selected from the group consisting of alumina, silica, zirconia, niobia, ceria, titania, and combinations thereof. The catalytic core can include an element selected from the group consisting of Pt, Pd, Rh, Co, Ni, Mn, Cu, Fe, (Continued)

Au, Ag, and combinations thereof. The porous shell can be selected from materials consisting of alumina, baria, ceria, magnesia, niobia, silica, titania, yttria, and combinations thereof.

20 Claims, 8 Drawing Sheets

(51) Int. Cl.
*B01J 37/03* (2006.01)
*B01J 37/16* (2006.01)
*B01J 21/08* (2006.01)
*B01J 23/40* (2006.01)
*B01J 23/48* (2006.01)
*B01J 23/70* (2006.01)
*B01J 35/00* (2006.01)
*B01J 37/02* (2006.01)
*B01D 53/94* (2006.01)

(52) U.S. Cl.
CPC ............... *B01J 23/42* (2013.01); *B01J 23/48* (2013.01); *B01J 23/70* (2013.01); *B01J 35/002* (2013.01); *B01J 35/006* (2013.01); *B01J 35/0013* (2013.01); *B01J 35/0086* (2013.01); *B01J 37/0211* (2013.01); *B01J 37/031* (2013.01); *B01J 37/16* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1028* (2013.01); *B01D 2255/2065* (2013.01); *B01D 2255/2073* (2013.01); *B01D 2255/2092* (2013.01); *B01D 2255/20738* (2013.01); *B01D 2255/20746* (2013.01); *B01D 2255/20753* (2013.01); *B01D 2255/30* (2013.01); *B01D 2255/908* (2013.01); *B01D 2255/9202* (2013.01); *Y02T 10/22* (2013.01)

(56) References Cited

U.S. PATENT DOCUMENTS

| | | | |
|---|---|---|---|
| 7,052,777 B2* | 5/2006 | Brotzman, Jr. | B01J 2/006 427/216 |
| 7,314,846 B2* | 1/2008 | Kuno | 502/326 |
| 7,820,291 B2* | 10/2010 | Kim et al. | 428/403 |
| 7,998,424 B2* | 8/2011 | Bergeal et al. | 422/180 |
| 2006/0204420 A1* | 9/2006 | Vaarkamp et al. | 423/247 |
| 2007/0026294 A1* | 2/2007 | Shimazaki et al. | 429/44 |
| 2008/0206562 A1* | 8/2008 | Stucky et al. | 428/403 |
| 2009/0209415 A1* | 8/2009 | Kayama et al. | 502/303 |
| 2010/0056366 A1* | 3/2010 | Lee | 502/300 |
| 2010/0062926 A1* | 3/2010 | Woodhouse et al. | 502/55 |
| 2010/0227134 A1 | 9/2010 | Shah et al. | |
| 2011/0143933 A1 | 6/2011 | Yin et al. | |
| 2011/0250122 A1* | 10/2011 | Joo et al. | 423/437.2 |

* cited by examiner

20nm

5nm

30nm  Electron Image 1

SINTER RESISTANT CATALYTIC MATERIAL AND PROCESS OF PRODUCING THE SAME

CROSS-REFERENCE TO RELATED APPLICATIONS

This application claims priority benefit to provisional patent application No. 61/691,445 filed Aug. 21, 2012, the subject matter of which is incorporated by reference in its entirety.

FIELD OF THE INVENTION

The invention is directed towards a catalytic material and a method for making the same, wherein the catalytic material includes a sinter-resistant porous shell with oxygen storage capability.

BACKGROUND

It is well known that platinum group metal (PGM) catalysts require high surface area to maintain their high catalytic activity and that sintering occurs at elevated temperature, resulting in lower surface area and therefore fewer sites for reactions to occur. In order to maximize the available surface area available for reactions, nanoparticles of the catalytic material are preferred as they have a high surface to volume ratio. This further complicates sintering as the nanoparticles have a strained surface and this makes agglomerating into larger particles energetically favorable.

There is therefore a need for sinter resistant catalyst particles that will operate at high temperatures and not lose activity due to sintering.

SUMMARY

The present disclosure relates to a catalytic material. The material includes: particles formed of a catalytic core material; a thermally resistant porous shell coated over the catalytic core material; and an oxygen storage material dispersed within the thermally resistant porous shell. In an example, the oxygen storage material is ceria.

The catalytic material can further include a catalytic support, wherein the particles are deposited on the catalytic support. The catalytic support can be a powdered oxide including a material selected from the group consisting of alumina, silica, zirconia, niobia, ceria, titania, yttria and combinations thereof. The catalytic core can include an element selected from the group consisting of Pt, Pd, Rh, Co, Ni, Mn, Cu, Fe, Au, Ag, and combinations thereof. The porous shell can be selected from materials consisting of alumina, baria, ceria, magnesia, niobia, silica, titania, yttria, and combinations thereof. In an example, the porous shell is a mixture of silica and alumina. In a further example, the particles are nanoparticles defining an average particle diameter of less than 1 micron.

The porous shell can be formed by removing a surfactant cap from a catalytic core coated with an oxygen storage-doped shell by applying heat. In an example, the thermally resistant porous shell resists sintering among particles of the catalytic material as compared to a catalytic material defining catalytic particles absent a thermally resistant porous shell. In yet another example, the thermally resistant shell resists sintering at temperatures of greater than at least 800 degrees centigrade as compared to the catalytic material defining catalytic particles absent a thermally resistant porous shell.

The present disclosure provides for a method of making a catalytic material doped with an oxygen storage material including the steps of: providing a catalytic core material having a surfactant layer; surrounding the catalytic core material having a surfactant layer with a thermal resistant shell material; adding an oxygen storage material to disperse into the shell material; depositing the catalytic core material having a surfactant layer surrounded by an oxygen storage material doped-thermal resistant shell material onto a catalytic support; and applying heat for a time and a temperature sufficient to remove the surfactant. In an example, the oxygen storage material is ceria.

DETAILED DESCRIPTION OF THE PREFERRED EMBODIMENTS

Referring to the Figures there is shown sinter resistant catalyst materials and a process for producing the materials. Sinter resistant materials may be formed by providing a catalyst particle, also referred to as a catalytic core material, with a surfactant cap and then synthesizing a thermally resistant shell about the catalyst particle. Example particles include metal nanoparticles including any of a first metal selected from Pt, Pd, Ru, Rh, Ir, Os, Au, Ag, Cu, Ni, Mn, Co, Fe, or their binary, ternary combinations, or some other suitable metal. In an example, the catalytic core is Pt. Example surfactant precursors may include at least one member selected from the group consisting of TTAB (tetradecyltrimethylammonum bromide), CTAB (cetyltrimethylammonium bromide), alkyl ammonium halide, alkyl amine, alkyl thiol, alkyl phosphine, PVP (poly(vinylpyrrolidone)), or another suitable capping agent (e.g., a surfactant or polymeric capping agent). Shell materials are metal oxides. In the examples below, $SiO_2$ is used. The metal oxide for the shell material can be provided through a metal oxide precursor. Examples of shell precursors include tetraethyl orthosilicate (TEOS). Other precursors are suitable and within the scope of the present disclosure. Example metal oxides suitable for a shell material include a first metal oxide selected from $SiO_2$, $Al_2O_3$, $TiO_2$, $ZrO_2$, $Ta_2O_5$, $Nb_2O_5$, their binary, ternary mixed oxides, or some other suitable metal oxide.

Figure 1:
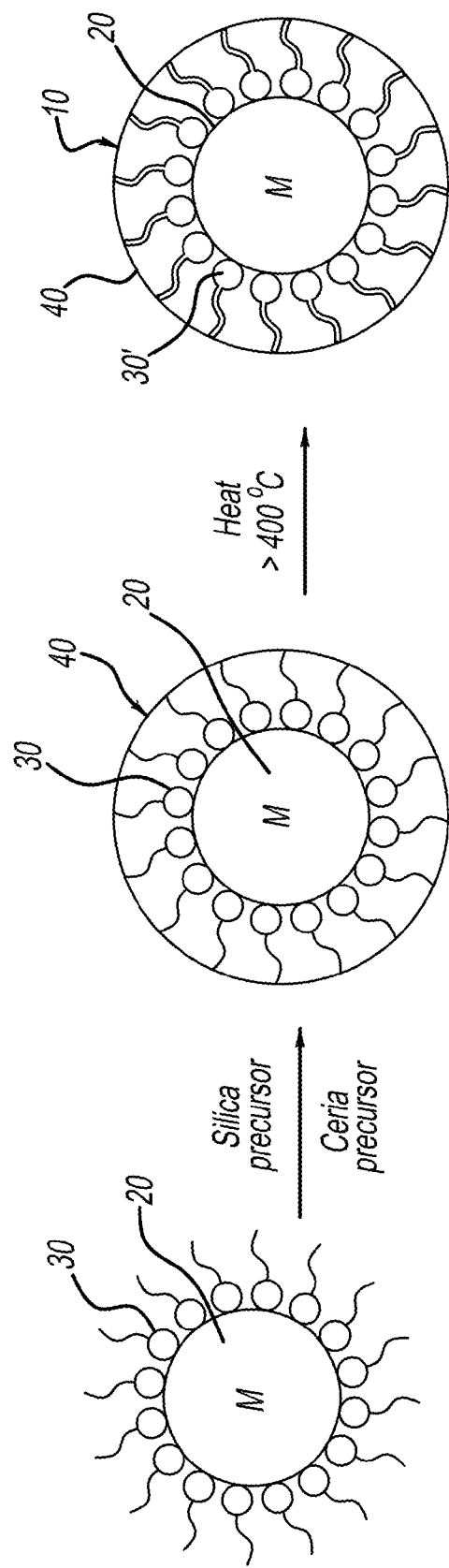
FIG. 1 is a diagram of the catalytic material including adding a shell material and an oxygen storage material and removing a surfactant to form a porous shell doped with an oxygen storage material surrounding a catalytic core.

FIG. 1 illustrates an example catalytic material 10 formed by a process according to the present disclosure. Catalytic material 10 includes a catalytic core material 20 represented by catalyst particle M. A surfactant cap 30 is provided that surrounds core material 20. A sinter-resistant shell 40 is formed around the catalytic material 20 and surfactant caps 30. The shell 40 is comprised of at least one metal oxide and an oxygen storage material. In this example, the shell includes silica, provided by a silica precursor and ceria as the oxygen storage material provided by a ceria precursor.

The surfactant 30 then may be removed by exposure to an elevated temperature to form a porous shell 40 allowing gaseous reactant to contact the catalyst particle. Voids 30' are formed from the heating step allowing gaseous access to the catalytic material 20. Various catalytic particles and shell materials may be utilized. For example, shell materials such as alumina, baria, ceria, magnesia, niobia, silica, titania, yttria, and combinations thereof may be utilized with the above identified catalytic materials.

Figure 2:
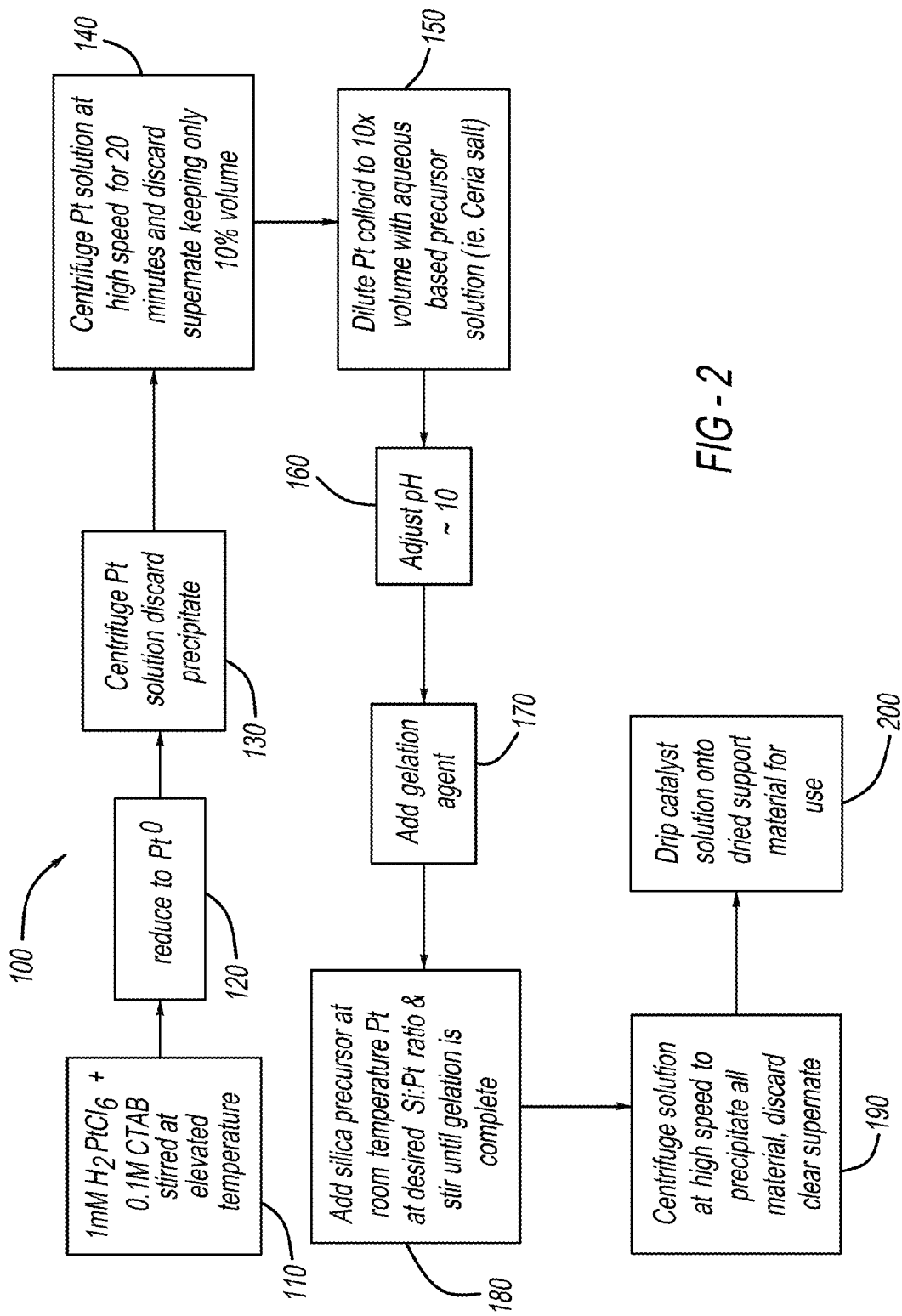
FIG. 2 is an example process diagram of the steps included in forming a sinter resistant catalyst having a shell doped.

Referring to FIG. 2 there is shown a process diagram for forming one embodiment of a sinter resistant material. The depicted embodiment includes a process for forming platinum particles having a silicon dioxide shell. The catalytic particles having a silicon dioxide shell are deposited on an alumina support.

Figure 3:
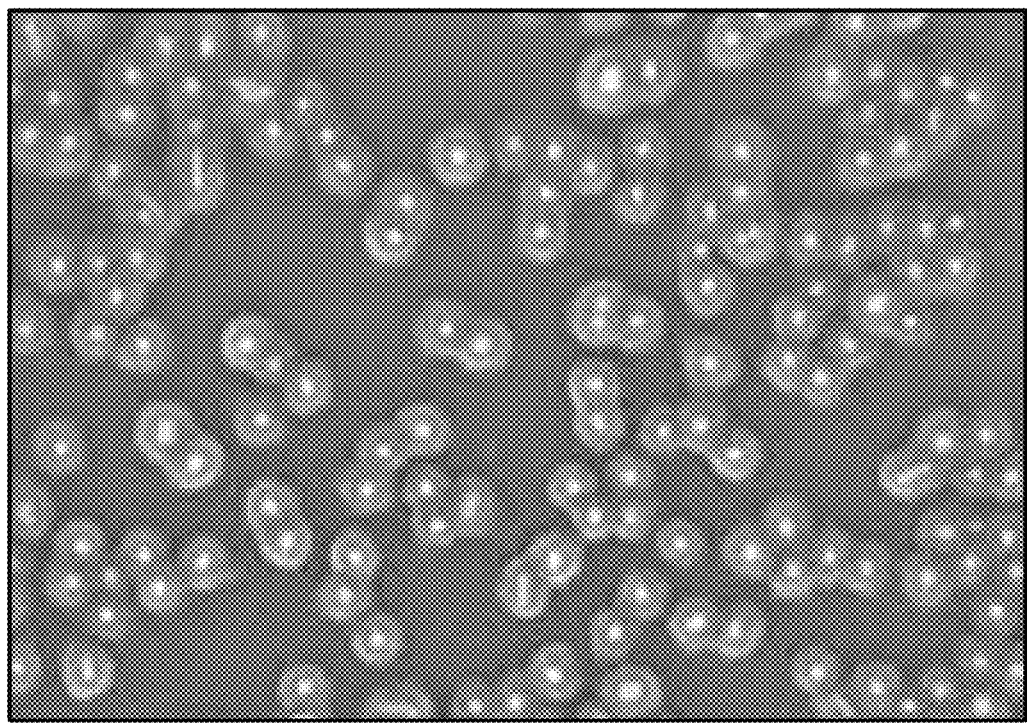
FIG. 3 is a TEM image of a sinter resistant catalyst material including a platinum core having a porous silicon dioxide shell.

The example of FIG. 2 includes the following process 100: In a first step shown in box 110, 0.1 M CTAB (example surfactant precursor) was stirred into 1 mM $H_2PtCl_6$ forming a clear orange solution. The process then advances to box 120 where a reductant such as ($NaBH_4$, $N_2H_4$, or $LiBH_4$) was added drop wise to the solution to reduce the platinum material to form a black solution. Advancing to box 130, the now black solution was centrifuged to precipitate any large particles. Advancing to box 140, the solution was again centrifuged at higher speed for 20 minutes precipitating the metal nanoparticles. At box 150, the resulting particles were then diluted with an aqueous ceria solution to the original volume. Advancing to box 160, the pH of the solution was adjusted to approximately 10 with the addition of a base such as $NH_4OH$, NaOH, or others. Advancing to box 170, a gelation initiating catalyst such as methanol is added. Next, at box 180 a silica precursor, tetraethyl orthosilicate (or tetramethyl orthosilicate, or other appropriate silica precursor) is added. The order of operation of box 170 and 180 is reversible. The solution was stirred for several days to form a shell about the platinum particles. At box 190, the aged solution was centrifuged to precipitate all of the material with subsequent removal of the supernate. At box 200, the resulting particles were deposited onto a dried alumina support material using incipient wetness impregnation. The supported material was then heated at a temperature above 400 degrees centigrade to remove the surfactant and form a porous silicon dioxide-ceria doped shell having a platinum core as shown in the TEM images of image of FIG. 3.

Figure 4:
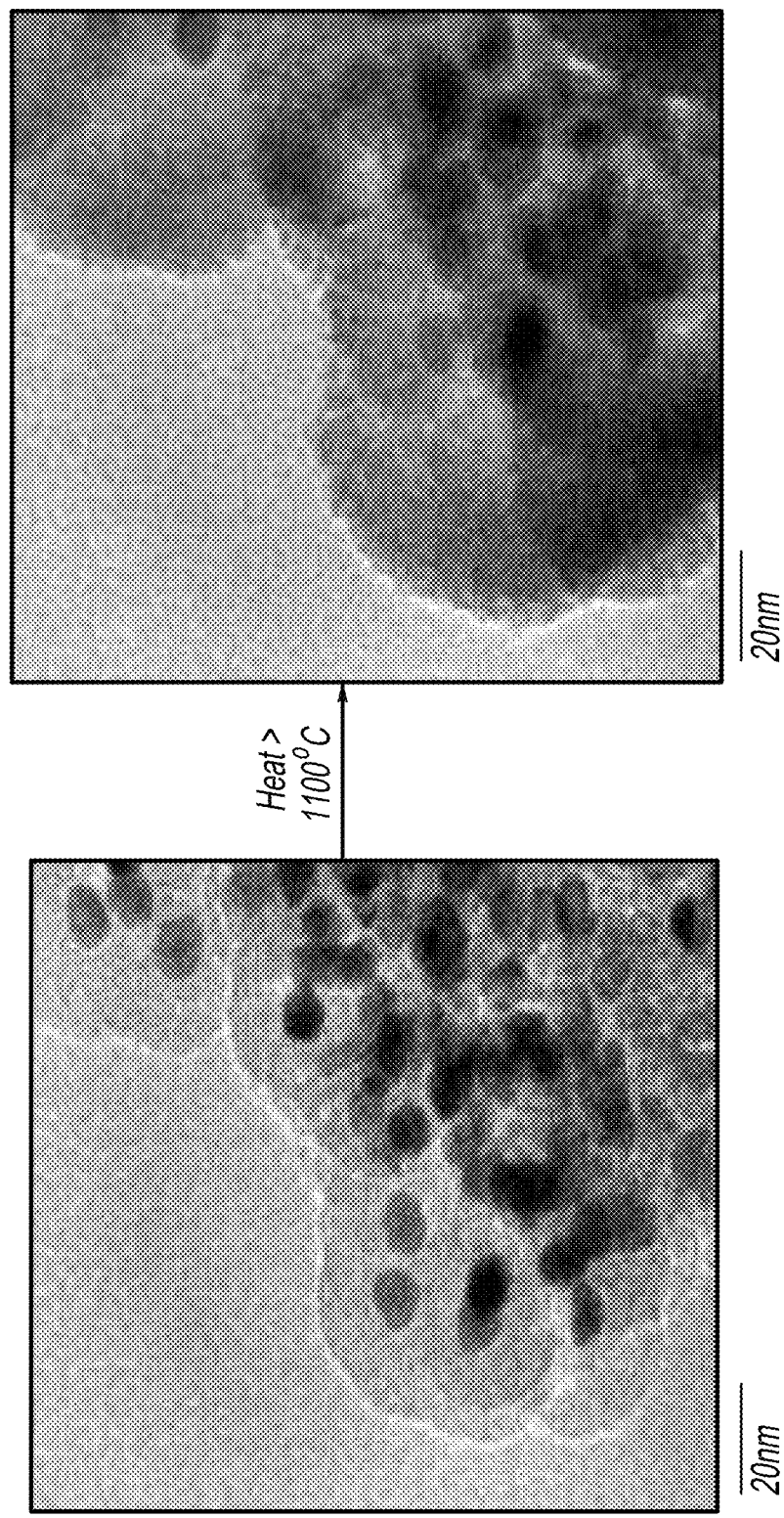
FIG. 4 illustrates a TEM image of a sinter resistant catalyst material including a platinum core having a porous silicon dioxide shell before and after in-situ exposure to heat greater than 1100 degrees centigrade.

The resulting particles were tested to show sintering resistance and reactivity properties. Referring to FIG. 4 there are shown TEM images of the $Pt@SiO_2$ particles dispersed on the alumina support at room temperature in FIG. 4 and after in-situ heating to a temperature greater than 1100 degrees centigrade. As can be seen in the images, the platinum core particles of the $Pt@SiO_2$ did not change in size demonstrating an improved thermal resistance and the ability to prevent sintering. This is in contrast to platinum particles deposited on an alumina support which grows by more than an order of magnitude lager when exposed to similar heating conditions.

Figure 5:
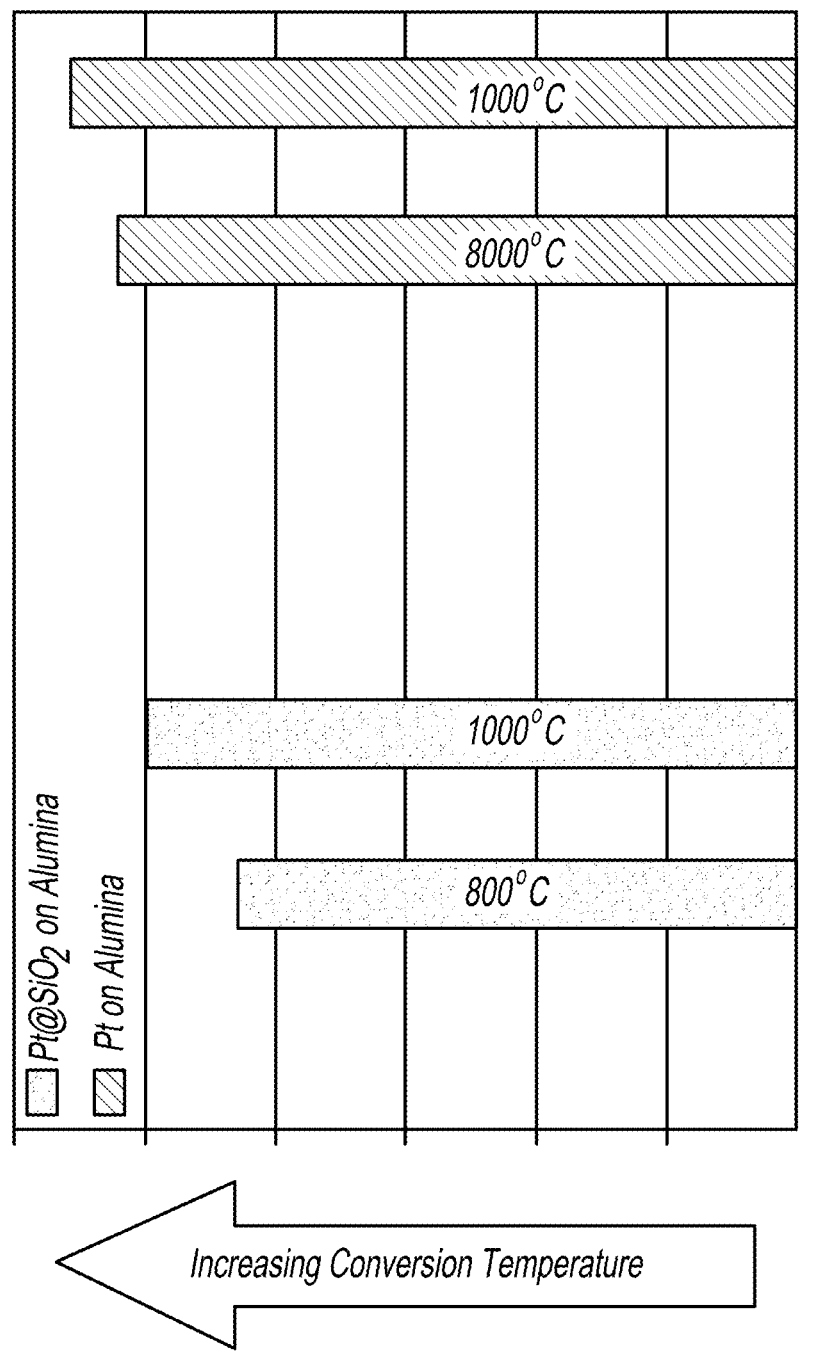
FIG. 5 is a bar graph comparing platinum particles disposed on an alumina support without a shell and a sinter resistant catalyst material including a platinum core having a porous silicon dioxide shell deposited on an alumina support as a function of increasing conversion temperature at a given aging temperature.

The catalytic performance of the $Pt@SiO_2$ on alumina material for decomposition of CO, $NO_X$, and hydrocarbons were tested simultaneously against a Pt on alumina without a shell. T-10 data (Temperature at which 10% conversion is observed) was obtained for aging temperatures of 800° C. and 1000° C. for each material. The conversion temperatures of the $Pt@SiO_2$ material compared to the Pt without a shell material are shown in FIG. 5. This data shows that the $Pt@SiO_2$ material functions as a three-way catalyst, reacting with CO, $NO_X$ and the large hydrocarbon molecules. The $Pt@SiO_2$ particles showed a superior performance at the elevated temperatures of 800° C. and 1000° C. demonstrating the sinter resistance and improved catalytic ability of the sinter resistant catalyst materials at elevated temperatures. Accordingly, 10% conversion is achieved at a lower temperature on the $Pt@SiO_2$ material for an elevated aging temperature as compared to a Pt material without a shell.

In a further example, the sinter resistant catalytic material of the present disclosure further includes a thermal resistant porous shell doped with an oxygen storage material. The oxygen storage material can be ceria. Adding an oxygen storage material improves the overall function of the catalytic material providing additional oxygen storage functionality. When in use, for example, a catalytic converter of a vehicle, the doped shell provides additional oxygen storage to the catalytic support material. This allows for the catalyst to maintain performance under a wider range of operating conditions by buffering the amount of oxygen to which the catalyst is exposed.

Figure 6A:
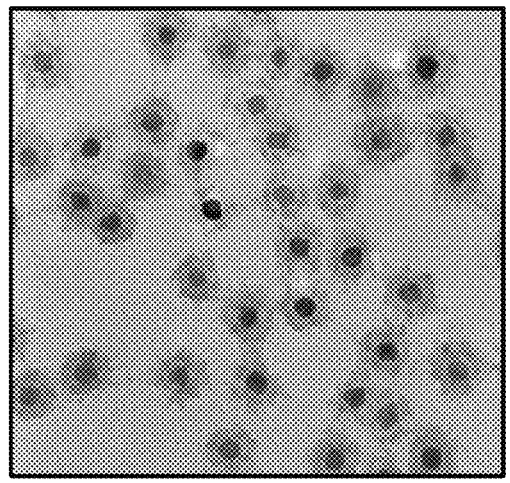
FIG. 6A-6F are TEM images of a sinter resistant catalyst material including a platinum core having a porous silicon dioxide shell doped with ceria and deposited on an alumina support.
Figure 6B:
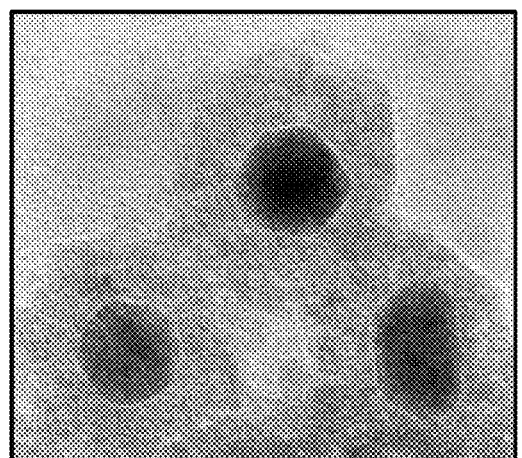
Figure 6C:
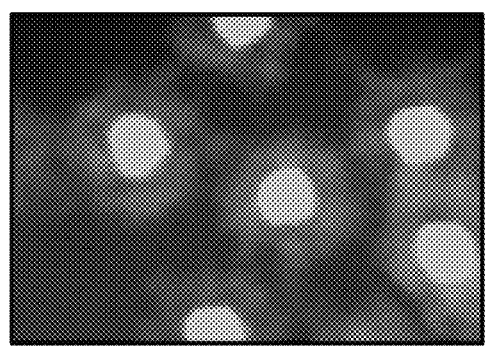
Figure 6D:
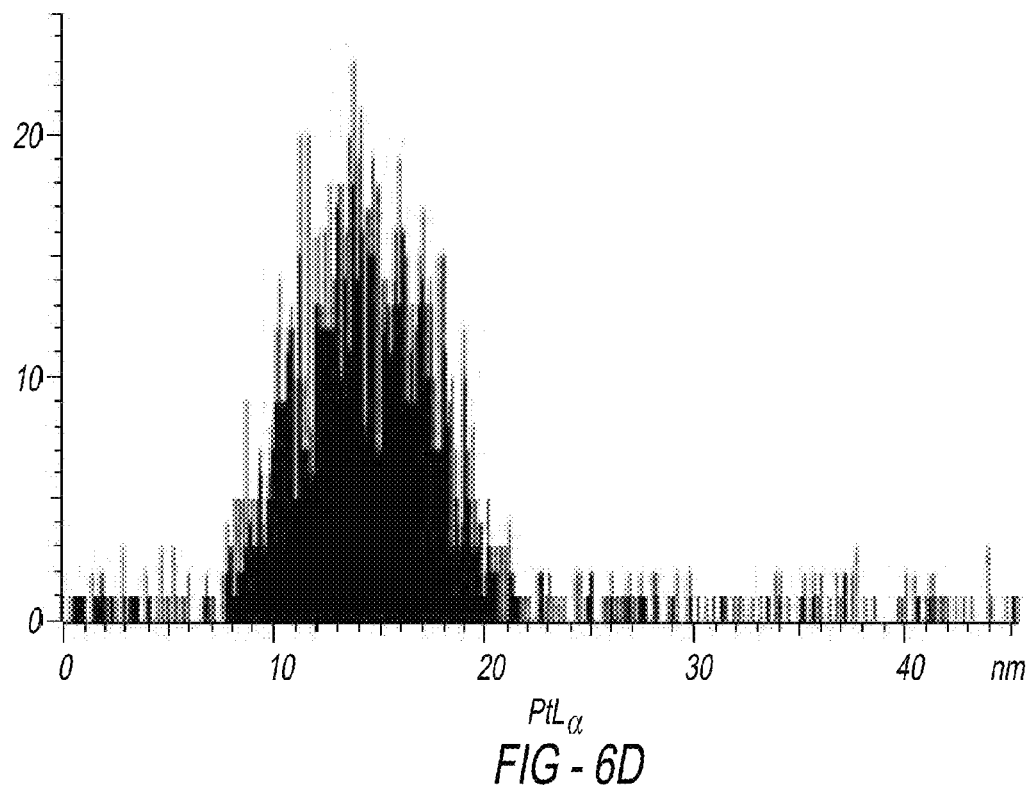
Figure 6E:
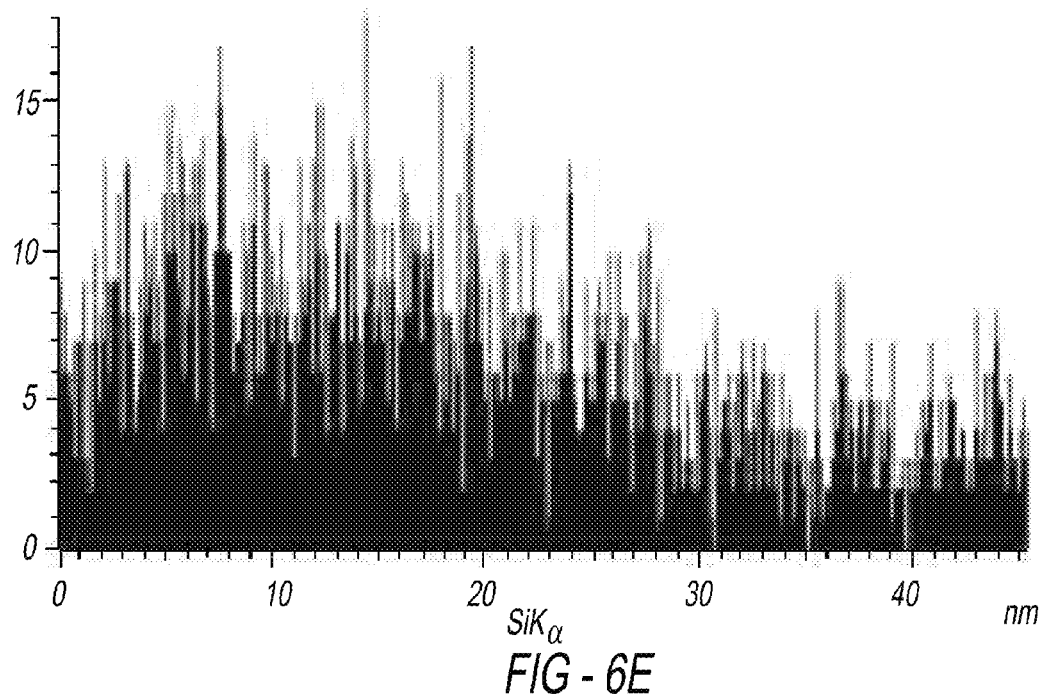
Figure 6F:
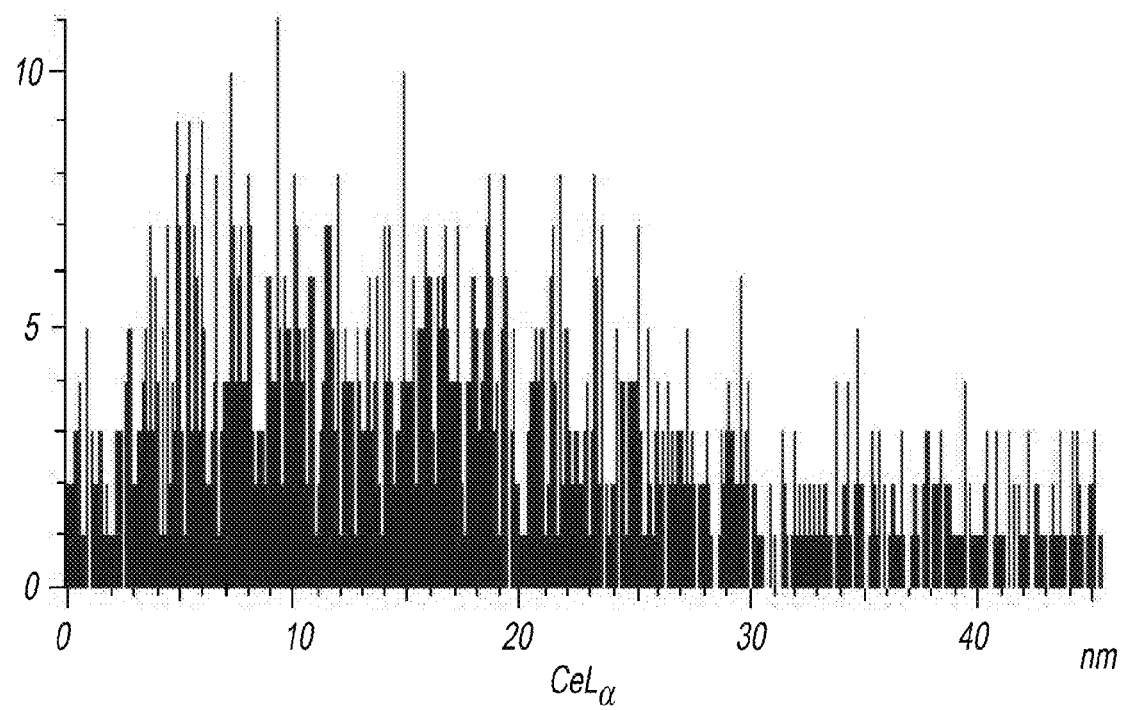

Referring to FIGS. 6A-6F there are shown TEM images of another embodiment of a sinter resistant catalytic material having an oxygen storage material. In the depicted images of 6A-6C, a platinum core is surrounded by a ceria doped silicon dioxide shell. FIGS. 6D-6F illustrate sliced concentration scatter intensity images of each element at a given wavelength for Pt, Si, and Ce.

The sinter resistant catalytic material can be used in any suitable application, particularly a vehicle application in a catalytic converter. However, other applications are deemed within the scope of this disclosure including larger commercial vehicles, locomotive, industrial applications, aerospace and the like, or any other combustion based process that results in residual combustion products such as carbon monoxide, hydrocarbons, or nitrogen oxides. Providing active catalytic materials that are resistant to sintering allows for production of catalytic converters with relatively less precious metal (such as Pt) to achieve the same or better catalytic function. Accordingly, significant cost savings can be achieved.

Many modifications and variations of the present invention are possible in light of the above teachings and may be practiced otherwise than as specifically described while within the scope of the invention.

What is claimed:

1. A catalytic material comprising:
   (a). particles formed of a catalytic core material wherein the catalytic core includes Pt;
   (b). a thermally resistant porous shell different from the catalytic core material and coated over the catalytic core material; and
   (c). a separate oxygen storage material relative to the porous shell, the oxygen storage material dispersed within the thermally resistant porous shell.

2. The catalytic material of claim 1 wherein the oxygen storage material is ceria.

3. The catalytic material of claim 1, further comprising a catalytic support, wherein the catalytic material is deposited on the catalytic support.

4. The catalytic material of claim 3 wherein the particles deposited on the catalytic support are washcoated onto a monolith substrate.

5. The catalytic material of claim 3 wherein the catalytic support is a substrate including a material selected from the group consisting of alumina, silica, zirconia, niobia, ceria, titania, and combinations thereof.

6. The catalytic material of claim 1 wherein the catalytic core includes an element selected from the group consisting Pd, Rh, Ir, Co, Ni, Mn, Cu, Fe, Au, Ag, and combinations thereof.

7. The catalytic material of claim 1 wherein the porous shell is selected from materials consisting of alumina, baria, ceria, magnesia, niobia, silica, titania, yttria, and combinations thereof.

8. The catalytic material of claim 1 wherein the porous shell is silica.

9. The catalytic material of claim 1 wherein the porous shell is a mixture of silica and alumina.

10. The catalytic material of claim 1 wherein the particles are nanoparticles defining an average particle diameter of less than 1 micron.

11. The catalytic material of claim 1 wherein the porous shell is formed by removing a surfactant cap from a catalytic core coated with an oxygen storage-doped shell by applying heat.

12. The catalytic material of claim 1 wherein the thermally resistant porous shell resists sintering among particles of the catalytic material as compared to a catalytic material defining catalytic particles absent a thermally resistant porous shell.

13. The catalytic material of claim 12 wherein the thermally resistant shell resists sintering at temperatures of greater than at least 800 degrees centigrade as compared to the catalytic material defining catalytic particles absent a thermally resistant porous shell.

14. A method of making a catalytic material doped with an oxygen storage material comprising the steps of:
   providing particles formed of a catalytic core material including Pt and having a surfactant cap;
   surrounding the particles with an thermal resistant porous shell material different from the catalytic core material and coated over the catalytic core material;
   adding an oxygen storage material separate relative to the porous shell to disperse into the thermal resistant porous shell material;
   depositing the particles surrounded by the shell material and oxygen storage material onto a catalytic support; and
   applying heat for a time and a temperature sufficient to remove the surfactant layer.

15. The method of claim 14 wherein the oxygen storage material is ceria.

16. The method of claim 14 wherein the particles deposited on the catalytic support are washcoated onto a monolith substrate.

17. The method of claim 14 wherein the catalytic support is a substrate including a material selected from the group consisting of alumina, silica, zirconia, niobia, ceria, titania, and combinations thereof.

18. The method of claim 14 wherein the porous shell is selected from materials consisting of alumina, baria, ceria, magnesia, niobia, silica, titania, yttria, and combinations thereof.

19. The method of claim 14 wherein the catalytic core includes an element selected from the group consisting of, Pd, Rh, Ir, Co, Ni, Mn, Cu, Fe, Au, Ag, and combinations thereof.

20. A catalytic material comprising:
   a) particles formed of a catalytic core material;
   b) a thermally resistant porous shell different from the catalytic core material and coated over the catalytic core material wherein the porous shell is a mixture of silica and alumina; and
   c) a separate oxygen storage material relative to the porous shell, the oxygen storage material dispersed within the thermally resistant porous shell.

* * * * *